United States Patent [19]
Kuntz

[11] Patent Number: 5,565,101
[45] Date of Patent: Oct. 15, 1996

[54] OIL AND WATER SEPARATOR

[75] Inventor: James Kuntz, Spokane, Wash.

[73] Assignee: Spokane Industries, Inc., Spokane, Wash.

[21] Appl. No.: 389,145

[22] Filed: Feb. 15, 1995

[51] Int. Cl.$^6$ .................... B01D 21/24; B01D 21/26
[52] U.S. Cl. .............. 210/304; 210/512.1; 210/242.3; 210/923; 210/519
[58] Field of Search ................. 210/512.1, 512.3, 210/787, 242.3, 923, 304, DIG. 5, 377, 519

[56] References Cited

U.S. PATENT DOCUMENTS

| 2,205,336 | 6/1940 | Beach . | |
|---|---|---|---|
| 3,527,348 | 9/1970 | Lalonde et al. . | |
| 4,014,791 | 3/1977 | Tuttle . | |
| 4,064,054 | 12/1977 | Anderson et al. . | |
| 4,855,050 | 8/1989 | Senyard, Sr. et al. | 210/512.1 |
| 5,252,229 | 10/1993 | Rojey et al. | 210/512.1 |
| 5,277,806 | 1/1994 | Kuntz | 210/521 |

Primary Examiner—David A. Reifsnyder
Attorney, Agent, or Firm—Wells, St. John, Roberts, Gregory & Matkin, P.S.

[57] ABSTRACT

A waste water treatment system includes a first stage oil separator having a plurality of conically shaped members disposed inside an enclosure. The conically shaped members are preferably made of polypropylene. Oil within the waste water coalesces upon contacting the conically shaped members. Waste water is circulated in vortical flow paths between the conically shaped members to lengthen the flow path of the waste water between the members thereby promoting coalescence of oil. A second stage oil separator involves a bead pack container unit filled with polypropylene beads through which waste water passes to remove residual oil and debris from the waste water coming from the first stage oil separator.

39 Claims, 12 Drawing Sheets

$\pm\pm\square$ $\pm\pm$

OIL AND WATER SEPARATOR

TECHNICAL FIELD

This invention relates to waste water treatment systems, and more particularly, to oil separators used in waste water treatment-systems.

BACKGROUND OF THE INVENTION

Waste water treatment systems are taking on increasing importance as time passes. More waste water than ever is being generated, and the harmful effects of dumping untreated waste water into the environment are becoming more evident.

One specific need for suitable waste water treatment systems is in the area of industrial high pressure washing (e.g., for use in cleaning industrial equipment, engines, boats, etc.). The resulting waste water contains a variety of contaminants, including a substantial amount of oil and other debris. Such waste water is highly amenable to recycling and reuse in the same pressure washing system.

The need to separate oil from water as a preliminary matter in waste water treatment processes has long been recognized. Traditional oil separators have utilized a variety of ways to separate oil from water, such as tanks with a series of baffles and deflector plates, chemicals, and gas injection systems. Typically, separation of oil occurs prior to further clarification and filtration of the waste water.

Oil and water have different densities compared to one another and therefore tend to separate one from another after they have been mixed together. Oil has a lower relative density compared to water. and therefore will separate and rise above water in a vessel. The rate at which separation occurs depends, in large measure, upon the size of oil droplets mixed with the water. The bigger the droplet of oil, the more rapidly it will separate from water. Therefore, anything that will cause oil to coalesce will speed up separation.

One type of a prior oil separator is shown in U.S. Pat. No. 4,014,791. This patent discloses an oil separator unit having a deflector plate at the terminating end of the inlet pipe to reverse the flow of incoming fluid. This causes the fluid to interact with itself to stimulate separation of oil from the water. Another example is U.S. Pat. No. 4,064,054, which involves a wash tank having a plurality of baffle sections for promoting separation of oil from the water.

There remains a need, however, to provide an efficient, effective oil separator apparatus for use in waste water treatment systems. Specifically, there is a need to provide an oil separator that increases the rate by which oil coalesces, thereby accelerating the rate at which oil separates from waste water.

The present invention involves a first stage oil separator apparatus which promotes rapid coalescing of oil as it enters into a separator tank. The invention further involves a second stage separator apparatus wherein waste water from the first stage oil separator is directed through a polypropylene bead pack for further separation of residual oil and debris from the waste water. The waste water treatment system of the present invention is a flow-through system. Other features, advantages, and objects of the invention will become apparent from the detailed disclosure that follows.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Pat. Laws "to promote the progress of science and useful arts" (Article 1, Section 8).

With reference to FIGS. 1–4, one aspect of the present invention involves an oil separator apparatus 10 comprising an enclosure 12 formed by a peripheral, outer enclosure wall 13, and a conical bottom wall 18. An inlet 14 is attached to the enclosure 12 to controllably permit waste water, which includes a mixture of oil and water, to enter into the enclosure. The waste water 14 can come from an industrial process 184 such as a pressure washer, or other process that results in waste water. In one embodiment, the waste water is conveyed from the process 184 to a sump 186 where, upon collection to a certain level, it is pumped to the inlet 14. Upon pumping, the sump may trigger other processes described below. An outlet 16 is also coupled to the enclosure 12 for permitting the treated waste water to pass outside of the enclosure.

Figure 1:
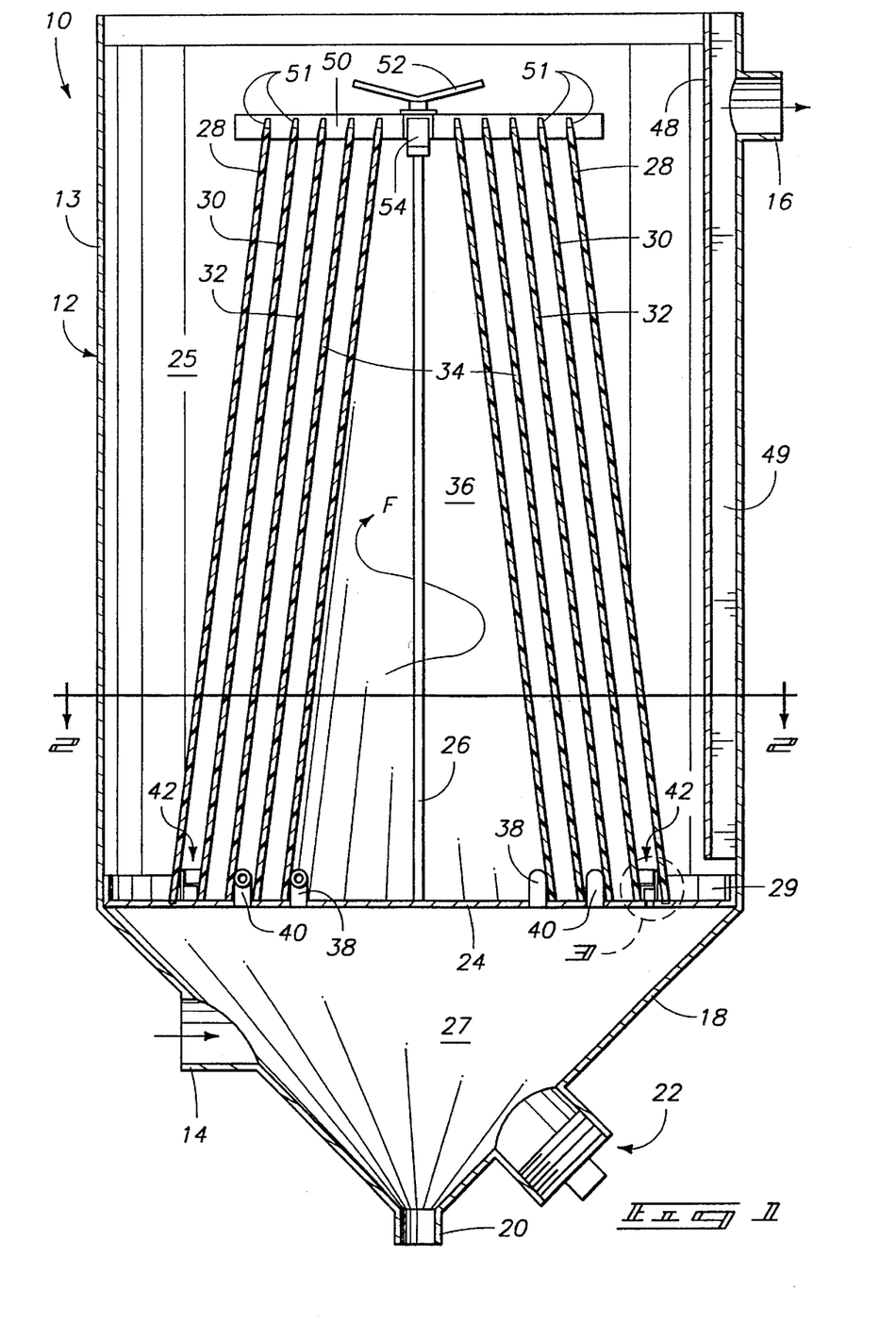
FIG. 1 is a sectional side elevation view of an oil separator apparatus according to the present invention.

A drain 20 is formed at the bottom of the enclosure 12 for removing sludge that accumulates at the bottom of the conical wall 18. A clean-out location 22 is also provided in the bottom of conical wall 18 for allowing access into the first area 27 of the enclosure to remove accumulated sludge from the top surface of the conical wall 18.

A dividing wall 24 separates the enclosure 12 into two basic portions: a first area 27 and a main area 25. An upwardly extending flange 29, which extends integrally from the dividing wall 24, is formed at the periphery of the dividing wall. The flange 29 abuts the enclosure wall and allows the dividing wall to be secured thereto. The dividing wall bifurcates the internal area of the enclosure. Heavy particles in the waste water will immediately settle out of the waste water while in first area 27, and will be removed via drain 20.

The dividing wall further defines a plurality of apertures over which a plurality of jets 38, 40, 42, 44, and 46 are mounted. Jets 38, 40, 44, and 46 are L-shaped. Jets 42 are specially formed scoops that are mounted over apertures 64 (FIG. 3) in the dividing wall 24. The jets fluidly communicate and direct waste water from first area 27 toward the main area 25.

A plurality of frusto-conically shaped members 28, 30, 32, 34, and 36 are mounted within the enclosure 12. Each conically shaped member includes a relatively larger diameter end and a relatively smaller diameter end. The respective larger diameter ends of the conically shaped members bear against the dividing wall 24, which supports the conically shaped members. The conically shaped members are nested inside one another and separated sufficiently to form conical passageways therebetween. In one embodiment, the conical members are made of polypropylene. Polypropylene is known for its ability to promote coalescing of oil.

Figure 2:
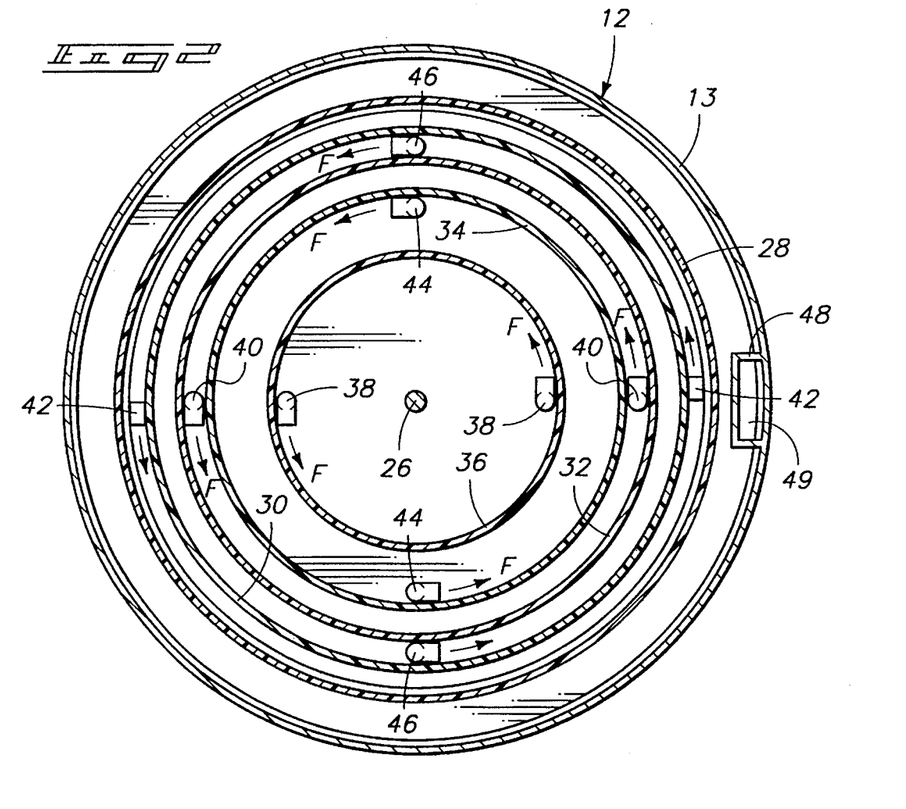
FIG. 2 is a sectional top view, taken along the line 2—2, of the oil separator apparatus of FIG. 1.
Figure 4:
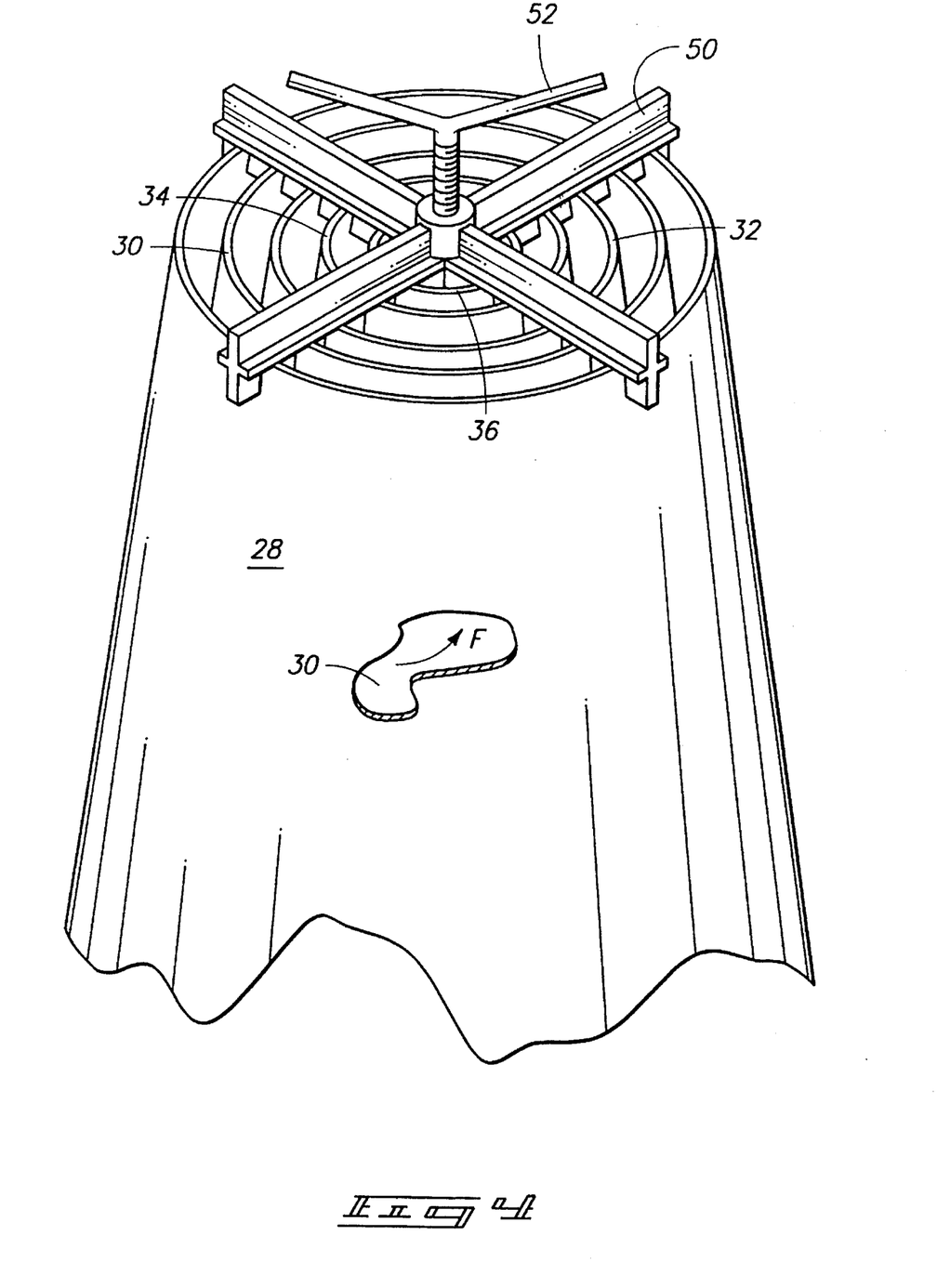
FIG. 4 is an isometric view of a plurality of conically shaped members disposed inside the oil separator apparatus of FIG. 1.
Figure 5:
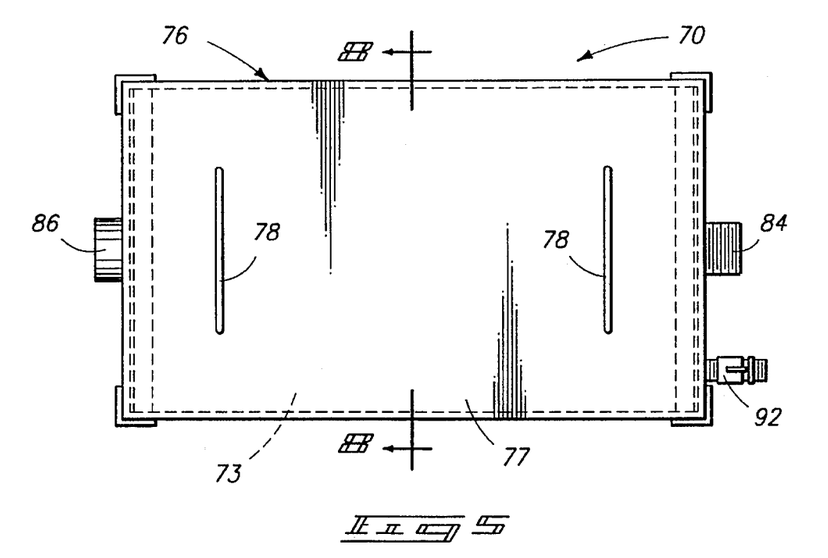
FIG. 5 is a top elevation view of a polypropylene bead pack container according to the present invention.
Figure 6:
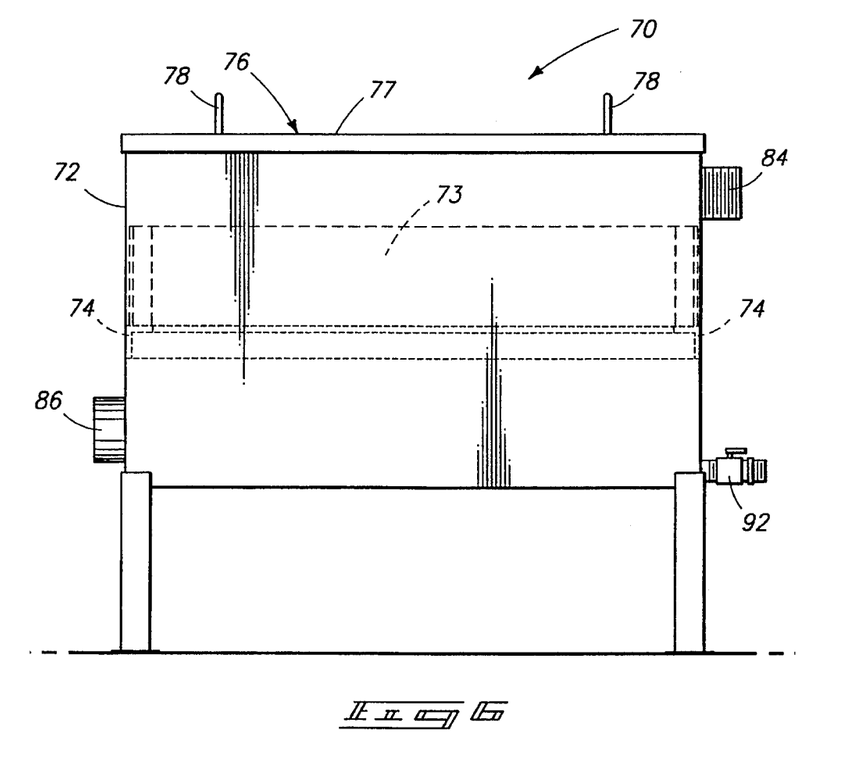
FIG. 6 is a side elevation view of the bead pack container of FIG. 5.
Figure 7:
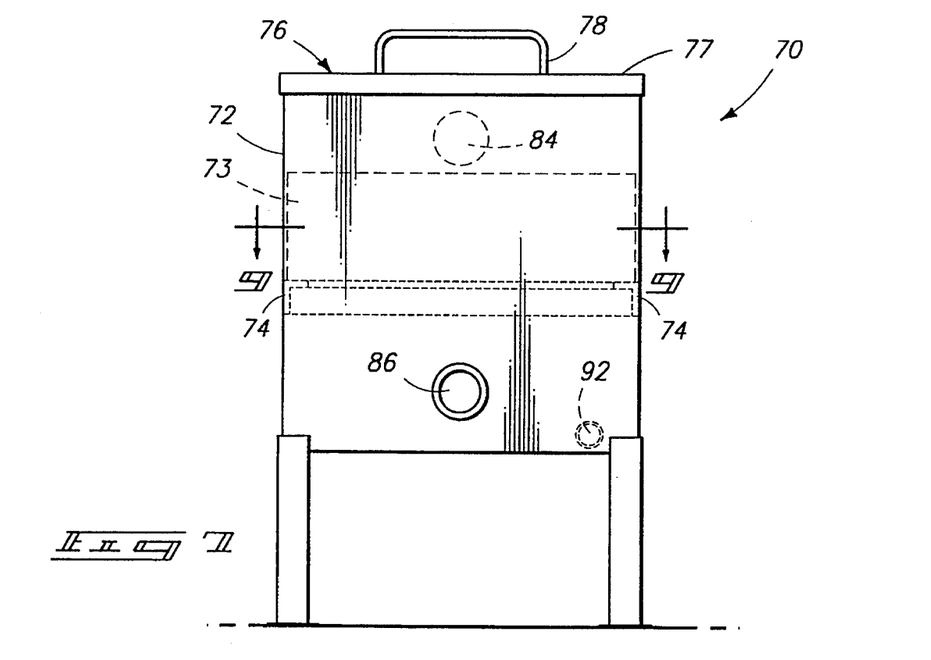
FIG. 7 is an end view of the bead pack container of FIG. 5.
Figure 8:
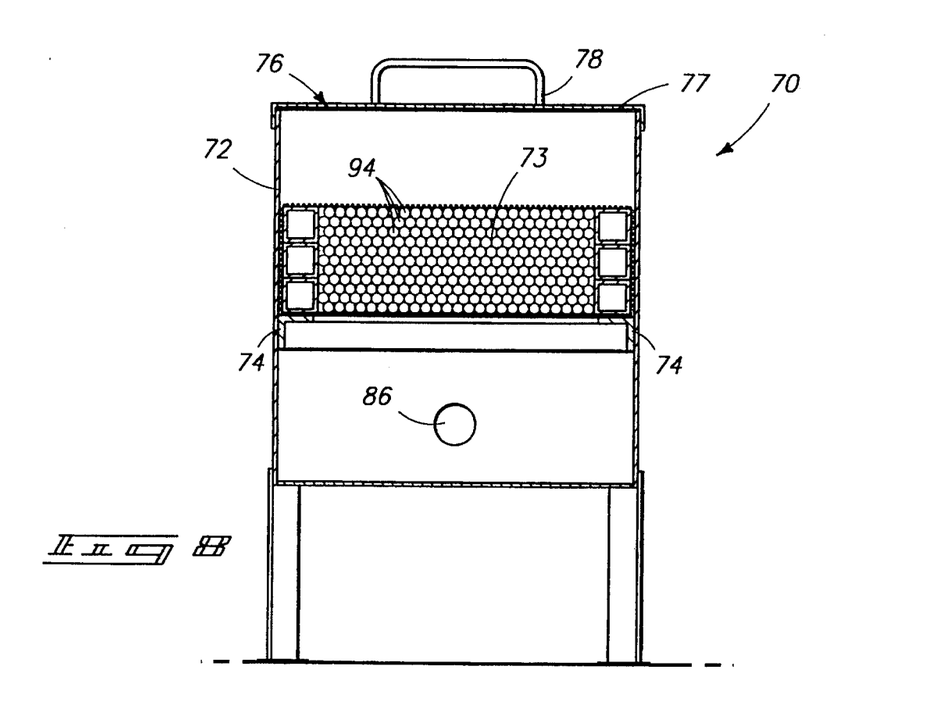
FIG. 8 is a sectional side elevation view, taken along the line 8—8, of the bead pack container of FIG. 5.
Figure 9:
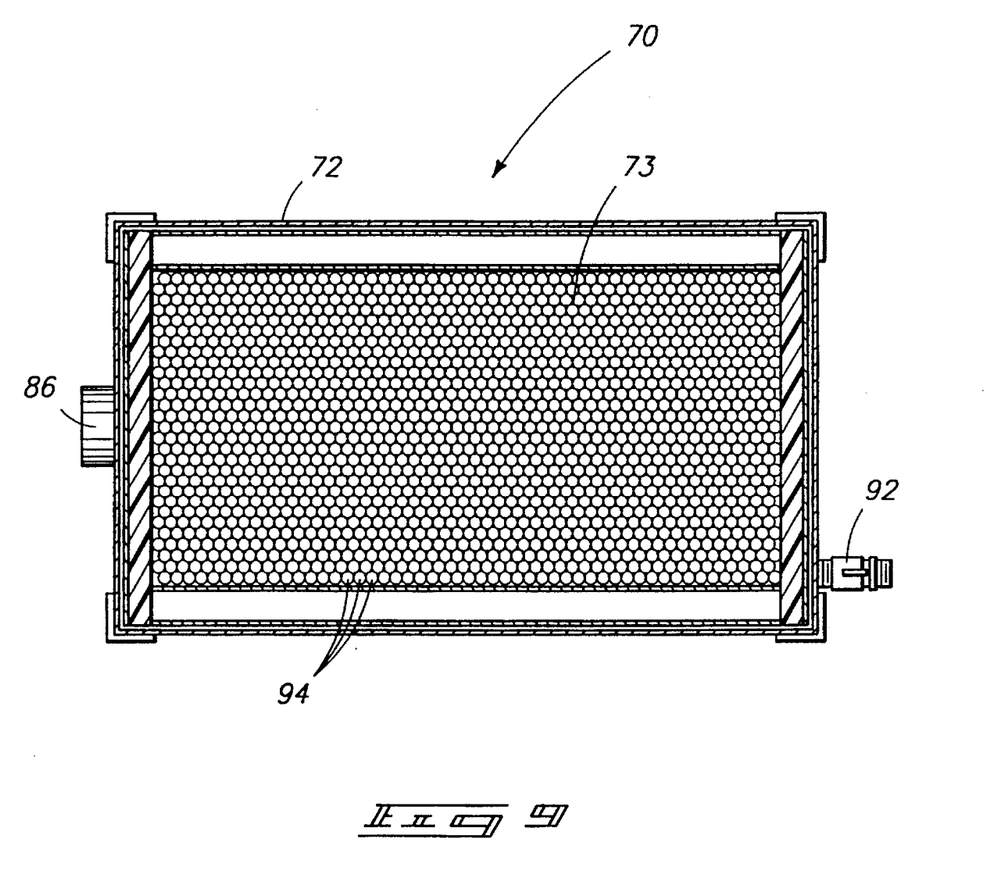
FIG. 9 is a sectional top view, taken along the line 9—9, of the bead pack container of FIG. 7.

The larger diameter ends of the conically shaped members 28, 30, 32, 34, and 36 are inserted over the jets 38, 40, 42, 44, and 46 such that two jets are disposed inside each of the conically shaped passageways. The jets direct waste water from first area through the conical passageways in a vortical flow path F. This causes the waste water to flow gradually upward in a spiralling manner, instead of rising directly to the top of the enclosure. As shown in FIG. 2, the jets create a vortex and direct the waste water through the passageways in a counter-clockwise manner. With reference to FIG. 4, the flow F gradually spirals upward until it passes through the top ends of conical members 28, 30, 32, 34, and 36 and into the main area 25.

The conically shaped members 28, 30, 32, 34, and 36 are preferably made of polypropylene to facilitate and promote coalescing of oil. It is to be understood, however, that other materials may be used in constructing the conically shaped members. Since polypropylene promotes coalescing of oil, the more contact the waste water has with the polypropylene surfaces, the more rapidly the oil will coalesce and separate from the waste water. Accordingly, the present invention dramatically increases the length of flow path of the waste water adjacent the conical members by creating a vortex which causes the waste water to spiral upward toward the top of the conically shaped members.

Figure 3:
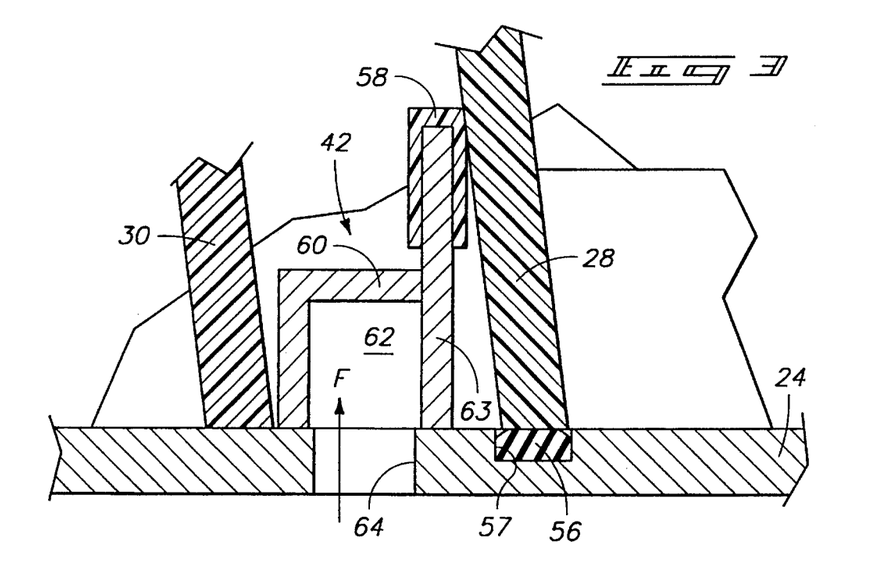
FIG. 3 is an enlarged view of area 3 shown in FIG. 1.

With reference to FIG. 3, the scoop jets 42 include an L-shaped front wall 60, a back wall 62 (only the position of wall 62 is shown), and an upstanding wall 63. The scoop jets 42 are attached to the top surface of the dividing wall 24 so as to be directly over apertures 64 (only one side shown) formed in the dividing wall 24. A U-shaped gasket 58 is positioned over the upstanding wall 63.

FIG. 3 also shows that the outermost conical member 28 is mounted within the enclosure so as to fit inside a groove 57 formed in the dividing wall 24. A seal 56 is disposed within the groove 57 to seal and prevent waste water from passing directly to the main area 25 from the first area 27 without first passing through the cone members.

The plurality of conical members 28, 30, 32, 34, and 36 are secured in place by means of an upstanding rod 26 mounted to the top surface of the dividing wall 24 and a cross arm assembly 50. The cross arm assembly 50 includes a plurality of slots 51 which correspond to the top edges of the conical members. The cross arm assembly 50 is inserted over the top edges of the conical members and is held in place by a butterfly-type bolt 52 which threads into a threaded receiving portion 54 coupled to the top end of upstanding rod 26.

Waste water is pumped or forced into the inlet 14. As waste water flows from the first area 27 to the main area 25, it necessarily passes through the plurality of conical members 28, 30, 32, 34, and 36 in a spiralling upward vortical flow path F, which causes oil to contact the surfaces of the conical members, coalesce, and rise to the surface of the enclosure. The oil is attracted to the polypropylene surfaces of the conically shaped members. As waste water spirals upward, the droplets of oil adhered to the conical members become bigger until they break away from the conical members and rise to the top of the enclosure 12. A skimmer, discussed in greater detail below, is used to remove oil from the top surface of the enclosure.

The oil separator apparatus 10 is used in a flow-through water treatment system of the present invention. The water level in enclosure 25 will correspond to the outlet 16. The flow-through system is a static flow system; therefore, the waste water is under a static load (e.g., 2–3 psi). It is to be understood, however, that it is within the scope of the present invention to increase the pressure of waste water flowing through the jets to increase the speed and length of flow path of the waste water within the conical passageways between the conical members, if desired.

After waste water has been treated in the oil separator 10, it passes through the outlet 16 and into an inlet 84 of a bead pack unit 70 (FIGS. 5–9). The bead pack unit 70 comprises a housing 72 having an open upper end, a ledge 74, an outlet 86 and a bead pack element 73 in the housing 72, sitting on the ledge 74. The inlet 84 is above the bead pack element 73, and the outlet 86 is below the bead pack element 73. The bead pack element 73 is removable from the housing 72 for cleaning. The bead pack element 73 includes opposite ends, a mesh screen in between the opposite ends, and a plurality of polypropylene beads 94 retained inside the mesh screen and the opposite ends of the element 72. The bead pack unit 70 further comprises a cover assembly 76. The cover assembly includes a handle 78 and a cover plate 77. The cover plate 77 sits on the bead pack housing 72.

Water discharge from the outlet 16 of the oil separator apparatus 10 is directed into the inlet 84 of the bead pack unit 70. Incoming water enters the inlet 84, and flows through the bead pack element 73 and passes to the outlet 86 under the force of gravity.

Residual oil and debris in the waste water discharged from the oil separator unit will adhere to and coalesce on the polypropylene beads 94 as the water flows through the bead pack element 73. This provides a second stage oil separator in the water treatment system of the present invention, and will remove substantially all residual oil from the water mixture. After a period of use, the bead pack will become clogged with oil, dirt, and other debris. The bead pack unit is cleaned by removing the bead element 73 from the housing and washing it with a pressure washer. The run-off water that results from washing the bead back can be directed back into the system for separation and clarification. A clean-out plug assembly 92 is provided at the bottom of the housing 72 for removing dirt and debris that may collect at the bottom of housing 72.

Figure 10:
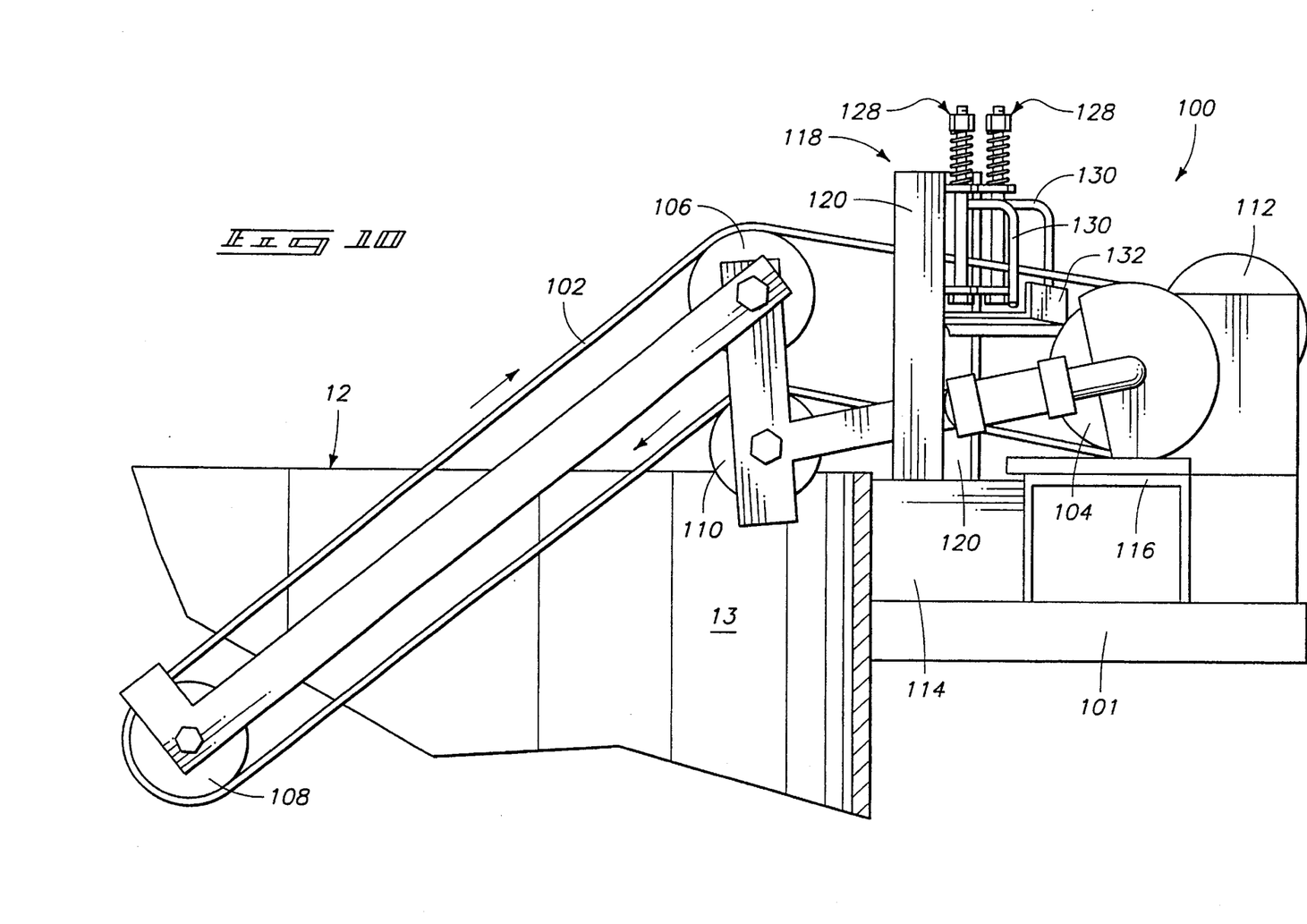
FIG. 10 is a side elevation view of an oil skimmer apparatus according to the present invention.
Figure 11:
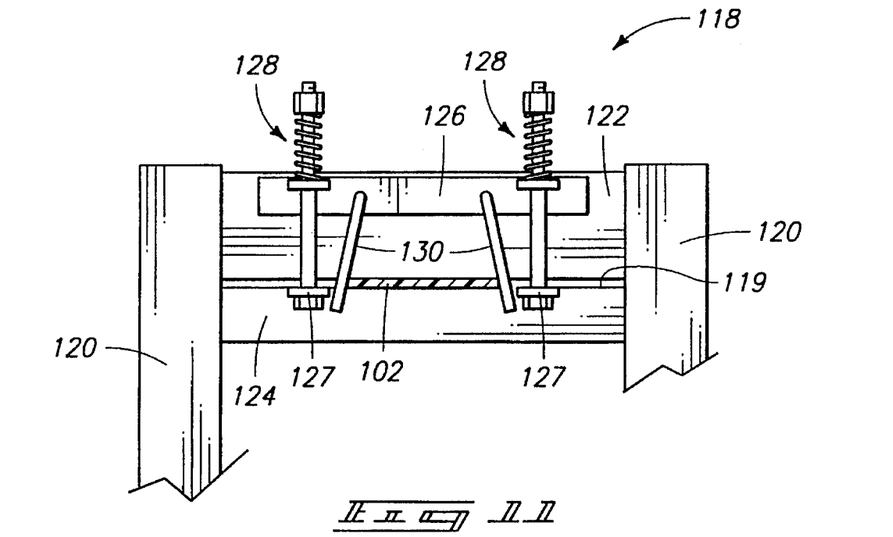
FIG. 11 is a partial rear view, partly in section, of the skimmer apparatus of FIG. 10.
Figure 12:
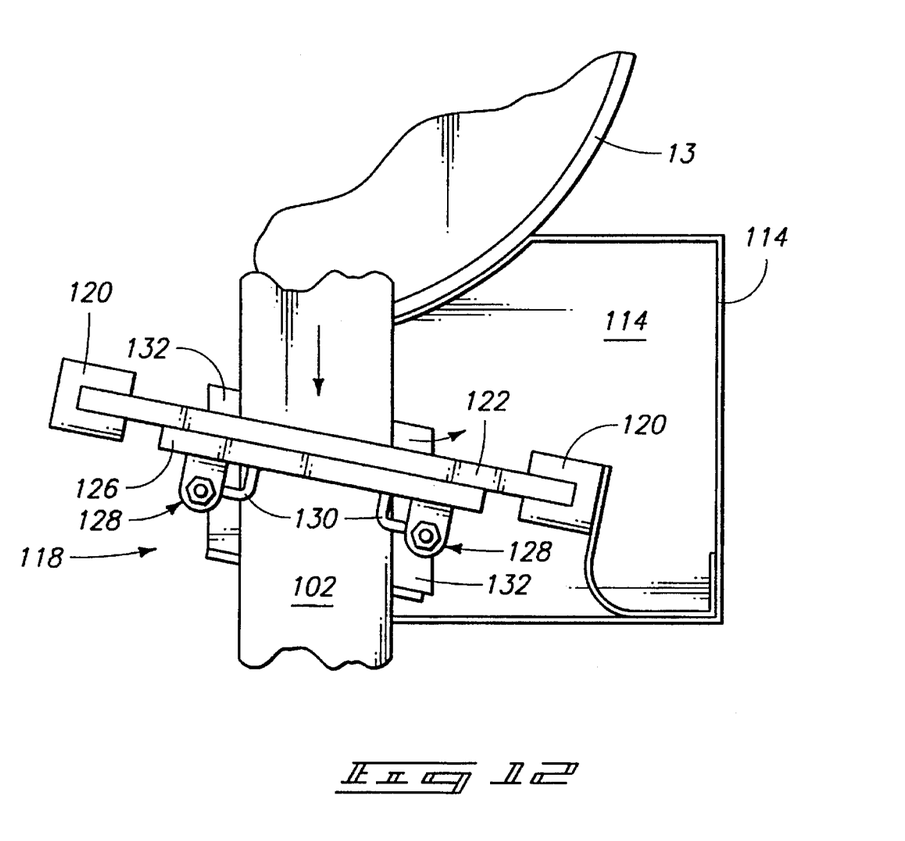
FIG. 12 is a partial top view of the oil skimmer apparatus of FIG. 10.

FIGS. 10–12 show an embodiment of a skimmer apparatus that may be used in connection with the oil separator apparatus shown in FIGS. 1–4. The oil skimmer apparatus 100 is mounted to the outer wall 13 of enclosure 12. The skimmer apparatus 100 is positioned on a platform 101 attached to the outer wall 13. A support base 116 is mounted on the platform 101 to support the drive roller and other components of the skimmer assembly 100.

The skimmer apparatus comprises a belt 102 entrained around a drive roller 104, an upper idler roller 106, a lower idler roller 108, and a support idler roller 110. The belt 102 is preferably made of polypropylene to attract oil. A motor 112 provides a rotational drive force to the drive roller 104 which moves the belt 102. The lower idler roller 108 is immersed below the surface of the waste water in the enclosure 12 to skim off the oil that rises to the surface.

With reference to FIGS. 11 and 12, the skimmer assembly 100 includes a belt scraper assembly 118 which removes oil that has adhered to the belt. The entire belt scraper assembly 118 is supported by a pair of frame posts 120. As shown in FIG. 11, the belt 102 passes through a slot 119 created by an upper blade 122 and a lower blade 124 which are positioned to engage the respective top and bottom surfaces of the belt 102. The top and bottom blades are secured in place by means of spring-biased bolt assemblies 128. The bolt assemblies 128 are secured to the upper blade by means of a mounting plate 126, and are secured to the lower blade 124 at mounting locations 127. The upper blade 122 and lower blade 124 are yieldably biased toward one another to accommodate for irregularities and periodic misalignment of the belt 102. The belt is maintained in a constant lateral position by means of two guide bars 130 attached to the mounting plate 126.

With reference to FIG. 12, as the belt 102 moves along its path, oil that has adhered to the belt will be scraped off of the belt primarily by the upper blade 122, but also by the lower blade 124 (FIG. 11). Oil that is scraped off the blade will fall onto a drip shield 132 mounted below the belt scraper assembly 118 to prevent the oil from dripping on the portion of the belt 102 that passes underneath the belt scraper assembly 118. The scraped off oil will flow, in turn, into a reservoir 114.

Figure 13:
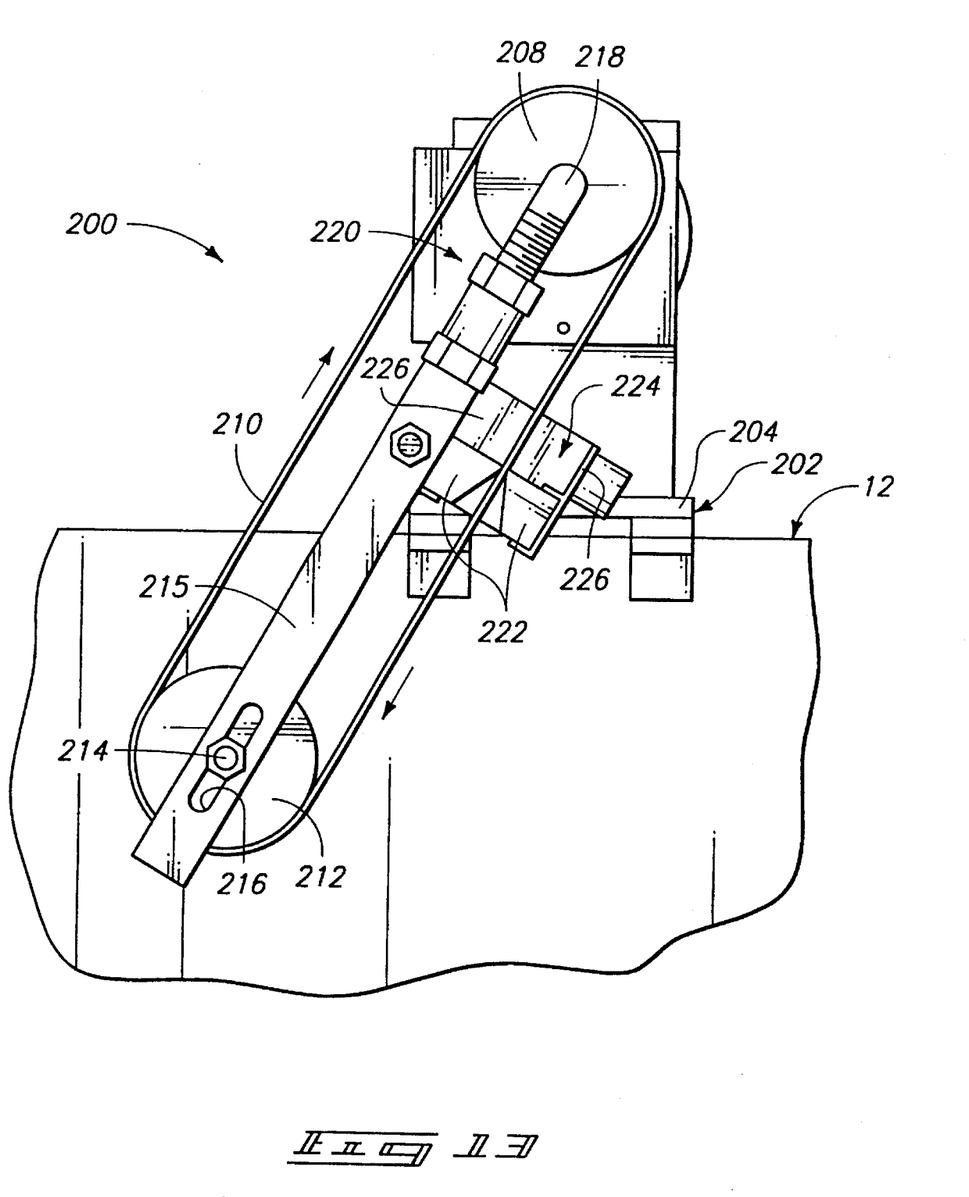
FIG. 13 is a side elevational view of an alternative embodiment of an oil skimmer apparatus according to the present invention.
Figure 14:
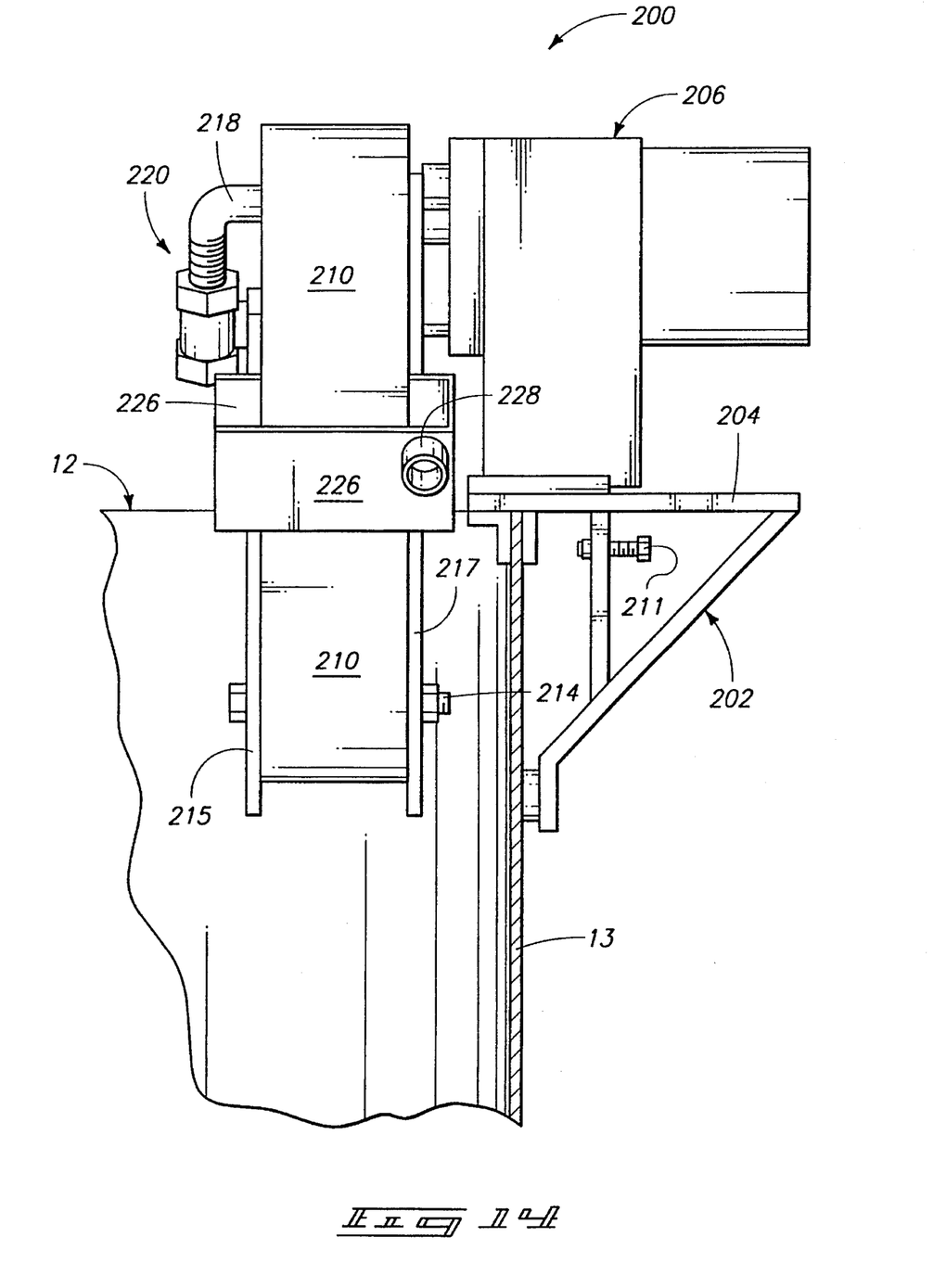
FIG. 14 is a rear view of the oil skimmer apparatus of FIG. 13.
Figure 15:
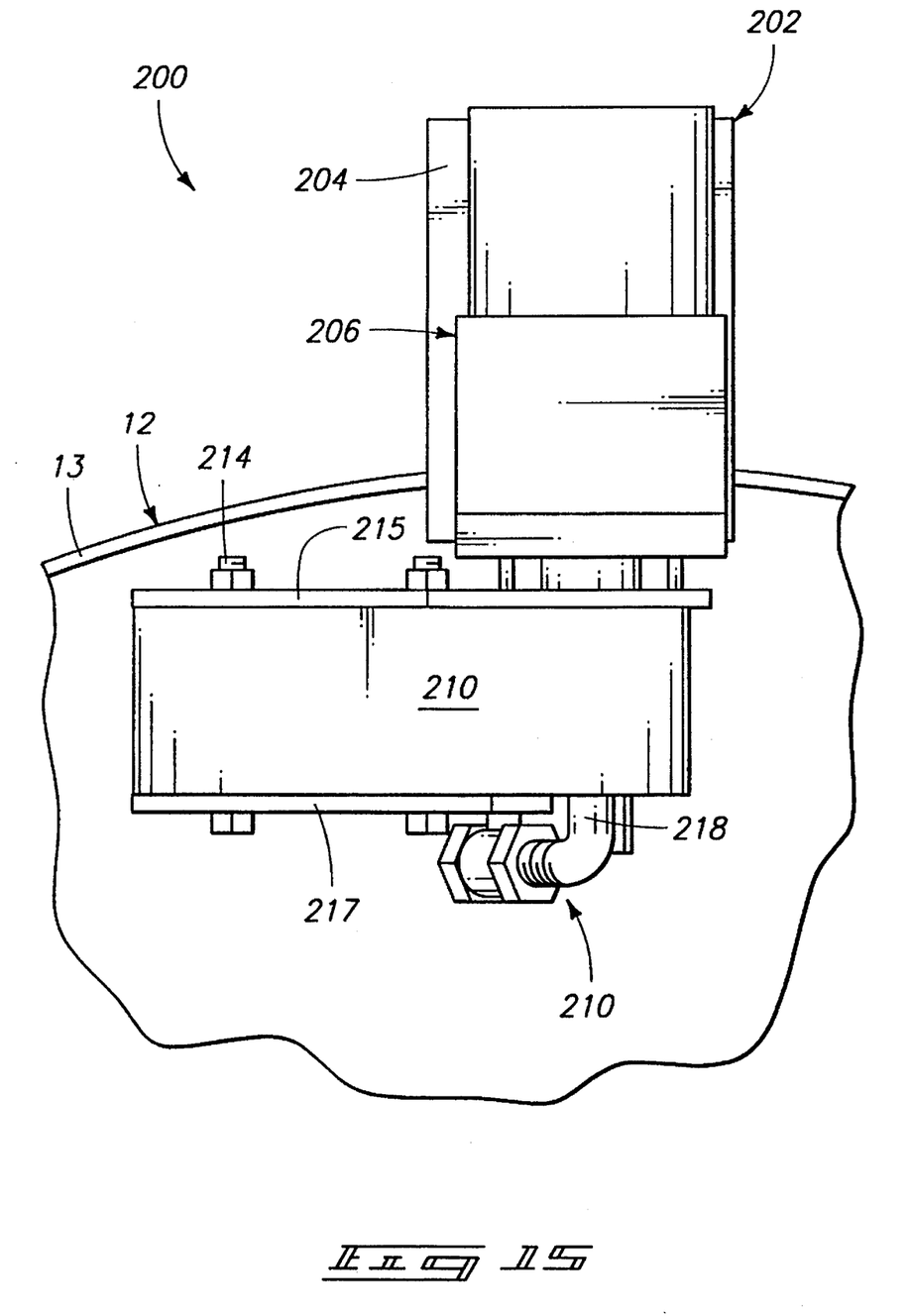
FIG. 15 is a top view of the oil skimmer apparatus of FIG. 14.

FIGS. 13–15 show an alternative embodiment of a skimmer apparatus 200 that may be used in combination with the oil separator apparatus of FIGS. 1–4. The oil skimmer apparatus 200 is mounted to the outer wall 13 of the enclosure 12 by means of a support bracket 202 which includes a horizontal platform 204 for supporting the skimmer apparatus 200. The support bracket 202 can be mounted to the enclosure wall 13 in any conventional manner. In the illustrated embodiment, the support bracket 202 sits on the enclosure wall 13, and includes a bolt 211 which is tightened to clamp or brace the bracket 202.

A motor assembly 206 is mounted to the top of the platform 204. The motor assembly rotates a shaft which, in turn, rotates a drive roller 208 around which a belt 210 is entrained. The belt is preferably made of polypropylene which will cause the oil to coalesce and adhere to the belt. The belt 210 is also entrained around an idler roller 212 opposite the drive roller 208. The drive roller 208 and the idler roller 212 are mounted relative to one another by means of opposed mounting brackets 215, 217.

The idler roller rotates about shaft 214, the position of which can be adjusted along slot 216 for tensioning the belt 210. The drive roller 208 rotates about an upper shaft portion 218 (FIGS. 14 and 15). The horizontal orientation of the shaft 218 can be adjusted by means of the threaded adjustment assembly 220 to ensure that the belt tracks properly.

The belt rotates in a clockwise direction as shown in FIG. 13. The belt passes through opposed rubber wipers 222 which engage the belt on both sides. A reservoir 224 is formed by the top surfaces of the rubber wipers 222 and upper reservoir walls 226. The oil that is removed from the belt 210 collects in reservoir 224 and is directed to the outside of the enclosure 12 through passageway 228.

Figure 16:
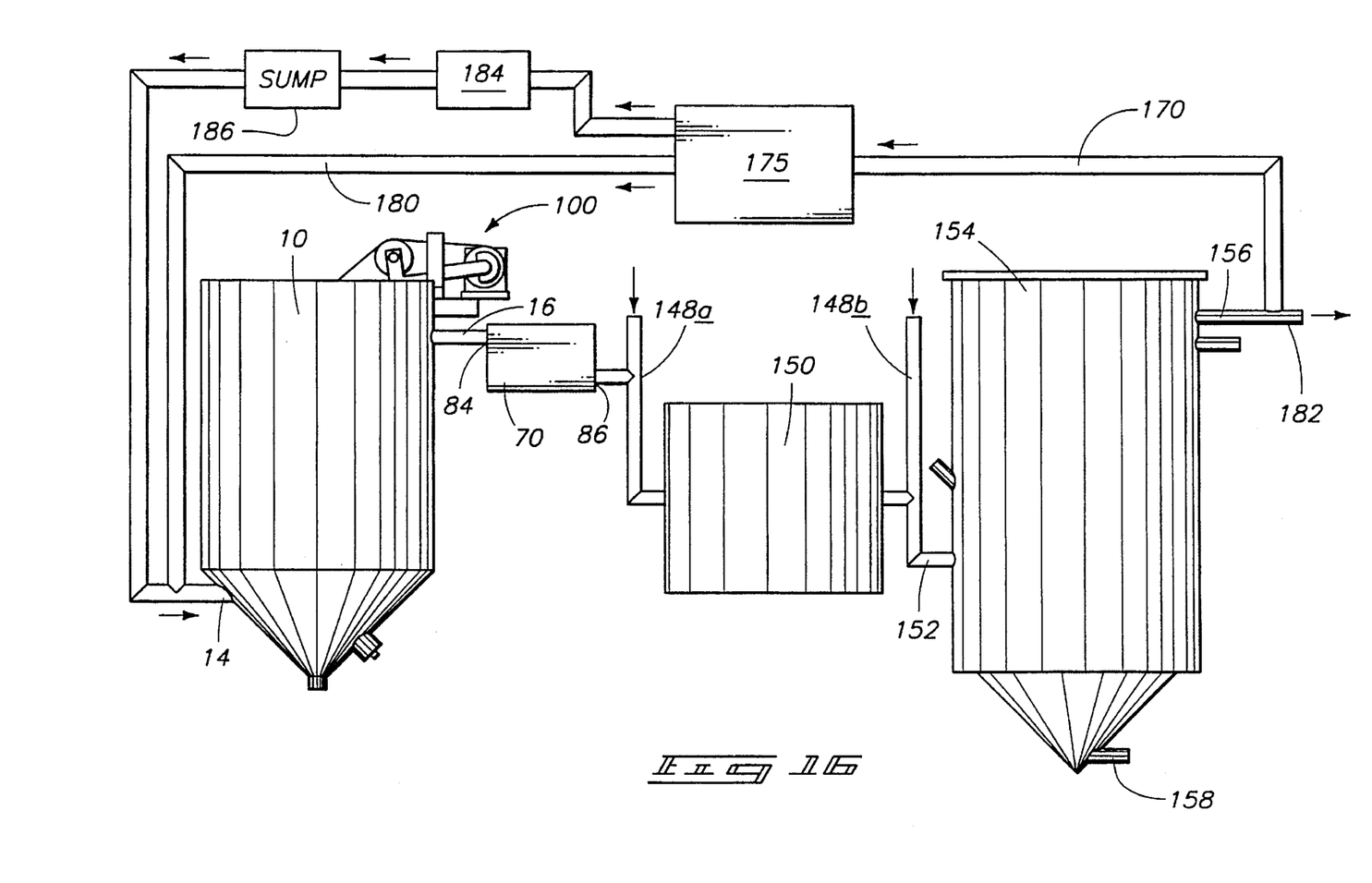
FIG. 16 is a schematic representation of a flow-through waste water treatment system according to the present invention.

FIG. 16 shows a schematic representation of an entire flow-through waste water treatment system including a first stage oil separator apparatus 10 having an inlet 14 and an outlet 16. A skimmer apparatus 100 removes substantially all of the oil that has been separated from the waste water of oil and water entering into inlet 14. A second stage oil separation apparatus is provided by means of a bead pack unit 70 having an inlet 84 fluidly connected to the outlet 16 of the oil separator apparatus 10. The bead pack unit 70 separates residual oil and other debris from the treated waste water leaving the first stage oil separator. The bead pack unit includes a plurality of polypropylene beads to which oil and other dirt and debris adheres. Treated waste water passes from the bead pack unit 70 through outlet 86. A line feed inlet or fitting 148a may be provided just beyond the outlet 86 so that cationic polymers can be added to the waste water to assist in further treatment of the waste water. In one embodiment of the invention, when the sump 186 collects waste water to a level that triggers pumping to the inlet 14, this also starts the addition of the cationic polymers.

A transfer box 150 is provided for adding sodium hydroxide to raise the pH level of the waste water prior to the waste water entering into a clarifier unit 154. A line feed inlet or fitting 148b may be provided just beyond the transfer box 150 so that anionic polymers can be added to the waste water to cause flocculation. Waste water from the transfer box is introduced into the clarifier unit by means of an inlet 152. The clarifier unit is fully described in U.S. Pat. No. 5,277,806, which is incorporated by reference in its entirety herein. Particulate matter is removed via outlet 158 and treated water leaves the clarifier via outlet 156.

After the waste water leaves the system as treated water via line 156, the treated water is ready for reuse as pressure wash water or the like, or can be directly discharged into a standard sanitary sewer system via discharge line 182. In still another alternative embodiment, treated water may be directed via line 170 into a holding tank 175 where ozone or another type of treatment may be added to the treated water to control the growth of bacteria. Ozone may be used, for example, where the addition of chlorine or other purifying chemicals may cause damage to the waste water treatment system and equipment. Treated water with ozone or another suitable additive can be directed via line 180 back into the separator apparatus 10 in a dormant flow cycle, e.g., to keep water flowing to prevent bacteria from growing.

Water from the holding tank 175 can be reused in the industrial process 184, such as pressure washing or the like, where the water becomes dirty and needs to be retreated. The dirty water from the industrial process 184 is conveyed to the sump 186. The sump upon collection to a certain water level, conveys the dirty water back to the inlet 14 of the oil separator apparatus 10.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An oil and water separator apparatus, comprising:
   an enclosure for holding waste water including oil and water, the enclosure including a peripheral wall defining a first area and a main area;
   a skimmer operatively coupled to the enclosure to remove oil from the waste water inside the enclosure;
   an inlet coupled to the enclosure to controllably allow introduction of incoming waste water into the first area of the enclosure;
   an outlet coupled to the enclosure to allow treated waste water to pass to the outside of the enclosure;
   a conically shaped passageway mounted within the enclosure fluidly communicating the first area with the main area of the enclosure;
   a dividing wall separating the first area from the main area, the dividing wall defining a plurality of apertures; and
   a plurality of jets mounted over the apertures, the jets directing waste water through the passageway in a vortical flow path.

2. An oil and water separator apparatus according to claim 1 wherein the conically shaped passageway includes a small diameter opening and a large diameter opening, and wherein the small diameter opening is upstream of the large diameter opening.

3. An oil and water separator apparatus according to claim 1 wherein the passageway comprises at least three conically shaped walls nested inside one another.

4. An oil and water separator apparatus according to claim 1, further comprising a dividing wall separating the first area from the main area, the dividing wall defining a plurality of apertures, and further comprising a plurality of jets mounted over the apertures, the jets directing waste water through the passageway in a vortical flow path toward the main area, and wherein the passageway comprises at least three conically shaped walls nested within one another.

5. An oil and water separator apparatus according to claim 1 wherein the passageway comprises a plurality of partitions nested inside one another, and further comprising a plurality of jets positioned between each of the partitions, the jets directing waste water in vortical paths between the partitions.

6. An oil and water separator apparatus according to claim 5 wherein each of the jets directs the waste water in the same vortical direction.

7. An oil and water separator apparatus according to claim 1 wherein the passageway is made of polypropylene.

8. An oil and water separator apparatus according to claim 1, further comprising a jet mounted within the enclosure to direct waste water through the passageway in a vortical flow path, the jet fluidly communicating the first area with the passageway.

9. An oil and water separator apparatus comprising:
   an enclosure for holding waste water including oil and water, the enclosure including a peripheral wall defining a first area and a main area;
   a skimmer operatively coupled to the enclosure to remove oil from the waste water inside the enclosure;
   an inlet coupled to the enclosure to controllably allow introduction of incoming waste water into the first area of the enclosure;
   an outlet coupled to the enclosure to allow treated waste water to pass to the outside of the enclosure; and
   a conically shaped passageway mounted within the enclosure fluidly communicating the first area with the main area of the enclosure, the passageway including a plurality of conically shaped walls nested inside one another.

10. An oil and water separator apparatus according to claim 9, further comprising a dividing wall separating the first area from the main area, and wherein each of the conically shaped walls includes a large diameter end and a small diameter end, the large diameter end engaging and being supported by the dividing wall.

11. An oil and water separator apparatus, comprising:
    an enclosure for holding waste water including oil and water;
    an inlet coupled to the enclosure to controllably allow introduction of incoming waste water into the enclosure;
    an outlet coupled to the enclosure to allow treated waste water to pass to the outside of the enclosure; and
    a passageway mounted within the enclosure and in fluid communication between the inlet and the outlet, the passageway including a plurality of conically shaped walls nested inside one another.

12. An oil and water separator apparatus according to claim 11, further comprising a dividing wall between the inlet and the passageway, and wherein each of the conically shaped walls includes a large diameter end and a small diameter end, the large diameter end engaging and being supported by the dividing wall.

13. An oil and water separator apparatus according to claim 11 wherein the passageway comprises at least three conically shaped walls nested inside one another.

14. An oil and water separator apparatus according to claim 11, further comprising a dividing wall between the inlet and the passageway, the dividing wall defining a plurality of apertures, and further comprising a plurality of jets mounted over the apertures, the jets directing waste water through the passageway in a vortical flow path.

15. An oil and water separator apparatus according to claim 11, further comprising a dividing wall between the inlet and the passageway, the dividing wall defining a plurality of apertures, and further comprising a plurality of jets mounted over the apertures, the jets directing waste water through the passageway in a vortical flow path, and wherein the passageway comprises at least three conically shaped walls nested within one another.

16. An oil and water separator apparatus according to claim 11 wherein the passageway comprises a plurality of partitions nested inside one another, and further comprising a plurality of jets positioned between each of the partitions, the jets directing waste water in vortical paths between the partitions.

17. An oil and water separator apparatus according to claim 16 wherein each of the jets directs the waste water in the same direction.

18. An oil and water separator apparatus according to claim 11 wherein the passageway is made of polypropylene.

19. An oil and water separator apparatus according to claim 11 wherein the jet is in fluid communication between the inlet and the passageway.

20. An oil and water separator apparatus, comprising:

container means for holding liquid comprising waste water including oil and water;

an inlet coupled to the container means to controllably allow introduction of incoming waste water into the container means;

an outlet coupled to the container means to allow treated waste water to pass outside of the container means;

passage means mounted within the container means for fluidly communicating liquid from the inlet to the outlet, the passage means including a plurality of conically shaped walls nested inside one another;

means for causing liquid within the peripheral wall of the container means to rotate in a vortical flow path.

21. An oil and water separator apparatus according to claim 20 wherein the means for causing liquid to rotate comprises a plurality of jets directing the waste water through the passage means in a vortical flow path.

22. An oil and water separator apparatus according to claim 20, further comprising a dividing wall separating the first area and the main area, the dividing wall defining a plurality of apertures, wherein the means for causing liquid to rotate comprises a plurality of jets mounted over the apertures, the jets directing the waste water through the passage means in a vortical flow path.

23. An oil and water separator apparatus according to claim 20 wherein the passage means is conically shaped.

24. An oil and water separator apparatus according to claim 20, further comprising a dividing wall separating the first area and the main area, and wherein each of the conically shaped walls includes a large diameter end and a small diameter end, the large diameter end engaging and being supported by the dividing wall.

25. An oil and water separator apparatus according to claim 20 wherein the passage means comprises at least three conically shaped walls nested inside one another.

26. An oil and water separator apparatus according to claim 20, further comprising a dividing wall separating the first area and the main area, the dividing wall defining a plurality of apertures, wherein the means for causing liquid to rotate comprises a plurality of jets mounted over the apertures, the jets directing waste water through the passage means in a vortical flow path.

27. An oil and water separator apparatus according to claim 20, further comprising a dividing wall separating the first area and the main area, the dividing wall defining a plurality of apertures, wherein the means for causing liquid to rotate comprises a plurality of jets mounted over the apertures, the jets directing waste water through the passage means in a vortical flow path, and wherein the passage means comprises at least three conically shaped walls nested within one another.

28. An oil and water separator apparatus according to claim 20 wherein the passage means comprises a plurality of partitions nested within one another, and wherein the means for causing liquid to rotate comprises a plurality of jets positioned between each of the partitions, the jets causing the waste water to flow between the partitions in a vortical flow path.

29. An oil and water separator apparatus according to claim 20 wherein the passage means is made of polypropylene.

30. An oil and water separator apparatus according to claim 20 wherein the vortex means comprises a jet fluidly communicating the first area with the passage means.

31. An oil and water separator apparatus, comprising:

an enclosure for holding waste water including oil and water, the enclosure including a peripheral wall and a dividing wall, the peripheral wall and the dividing wall together defining a first area and a main area, the dividing wall defining a plurality of apertures;

a skimmer operatively coupled to the enclosure to remove oil from the surface of the waste water inside the enclosure;

an inlet coupled to the enclosure to controllably allow introduction of incoming waste water into the first area of the enclosure;

an outlet coupled to the enclosure to allow treated waste water to pass to the outside of the enclosure;

a plurality of conically shaped members supported by the dividing wall;

a plurality of jets mounted between the conically shaped members and over the apertures to fluidly communicate the first area with the main area, the jets directing the waste water to flow through the conically shaped members in a vortical flow path.

32. An oil and water separator apparatus according to claim 31 wherein the conically shaped members are made of polypropylene.

33. An apparatus comprising:

an enclosure having an inlet adapted to receive a liquid and having an outlet;

a plurality of jets in the enclosure and in fluid communication with the inlet; and a passageway mounted within the enclosure and fluidly communicating liquid from the jets to the outlet, the passageway including a plurality of conically shaped members nested inside one another, the jets causing liquid to flow in a vortical flow path in the passageway.

34. An apparatus in accordance with claim 33 and further comprising a skimmer operatively coupled to the enclosure.

35. An apparatus in accordance with claim 33 wherein the passageway comprises at least three conically shaped walls nested inside one another.

36. An apparatus in accordance with claim 33 and further comprising a dividing wall in the enclosure between the inlet and the passageway, the dividing wall defining a plurality of apertures, wherein the jets are mounted over the apertures.

37. An apparatus in accordance with claim 33 wherein the conically shaped members define partitions, and wherein the jets are positioned between the partitions, the jets directing liquid in vortical paths between the partitions.

38. An apparatus according to claim 33 wherein each of the jets directs the liquid in the same vortical direction.

39. An apparatus according to claim 33 wherein the passageway is made of polypropylene.

* * * * *